(12) United States Patent
Barrett

(10) Patent No.: US 11,347,099 B2
(45) Date of Patent: May 31, 2022

(54) LIGHT MANAGEMENT FILTER AND RELATED SOFTWARE

(71) Applicant: Eyesafe, LLC, Eden Prairie, MN (US)

(72) Inventor: Justin Barrett, Eden Prairie, MN (US)

(73) Assignee: Eyesafe Inc., Eden Prairie, MN (US)

( * ) Notice: Subject to any disclaimer, the term of this patent is extended or adjusted under 35 U.S.C. 154(b) by 302 days.

(21) Appl. No.: 16/695,975

(22) Filed: Nov. 26, 2019

(65) Prior Publication Data

US 2020/0174168 A1 Jun. 4, 2020

Related U.S. Application Data

(60) Provisional application No. 62/772,513, filed on Nov. 28, 2018.

(51) Int. Cl.
*G02B 5/22* (2006.01)
*H05B 47/11* (2020.01)
(Continued)

(52) U.S. Cl.
CPC ......... *G02F 1/133514* (2013.01); *G02B 1/04* (2013.01); *G02B 5/003* (2013.01);
(Continued)

(58) Field of Classification Search
CPC ........ H05B 47/00; H05B 47/10; H05B 47/11; G02B 5/22; G02B 5/208; G02B 6/0051; G02B 1/04; G05B 5/003; G02F 1/133514; G02F 1/133536; G02F 1/133603; G02F 1/133614; G02F 1/133607; G02F 2201/086
See application file for complete search history.

(56) References Cited

U.S. PATENT DOCUMENTS

| 2,403,685 A | 7/1946 | Sachtleben |
| 2,493,200 A | 1/1950 | Land |

(Continued)

FOREIGN PATENT DOCUMENTS

| CN | 101216611 A | 7/2008 |
| CN | 101899222 A | 12/2010 |

(Continued)

OTHER PUBLICATIONS

Search Report and Examination Opinion for European Application No. 15796219.2; dated Aug. 12, 2017; date of filing: May 22, 2015; 7 pp.

(Continued)

*Primary Examiner* — Jimmy T Vu
(74) *Attorney, Agent, or Firm* — Grumbles Law PLLC; Brittany Nanzig

(57) ABSTRACT

The present disclosure describers a novel combination of a physical filter within an electronic device combined with software to manage the high-energy visible blue light spectrum in accordance with factors including total device use and cumulative intake of blue light. The physical filter may be integrated within layers of the display construction including within the cover glass or polarizer. In preferred embodiments, the physical filter with the software application automatically adjusts the total coverage of blue light emissions relative to each other and the system.

4 Claims, 3 Drawing Sheets

(51) Int. Cl.
  *G02F 1/1335* (2006.01)
  *G02B 1/04* (2006.01)
  *G02B 5/00* (2006.01)
  *G02F 1/13357* (2006.01)
  *F21V 8/00* (2006.01)
  *G02B 5/20* (2006.01)

(52) U.S. Cl.
  CPC ............ *G02B 5/208* (2013.01); *G02B 5/22* (2013.01); *G02B 6/0051* (2013.01); *G02F 1/133536* (2013.01); *G02F 1/133603* (2013.01); *H05B 47/11* (2020.01); *G02F 1/133607* (2021.01); *G02F 1/133614* (2021.01); *G02F 2201/086* (2013.01)

(56) References Cited

U.S. PATENT DOCUMENTS

| | | | |
|---|---|---|---|
| 3,382,183 A | 5/1968 | Donoian |
| 3,482,915 A | 12/1969 | Corley |
| 3,687,863 A | 8/1972 | Wacher |
| 4,618,216 A | 10/1986 | Suzawa |
| 4,842,781 A | 6/1989 | Nishizawa |
| 4,878,748 A | 11/1989 | Johansen |
| 4,966,441 A | 10/1990 | Conner |
| 4,989,953 A | 2/1991 | Kirschner |
| 5,083,252 A | 1/1992 | McGuire |
| 5,177,509 A | 1/1993 | Johansen |
| 5,446,569 A | 8/1995 | Iwai et al. |
| 5,483,464 A | 1/1996 | Song |
| 5,555,492 A | 9/1996 | Feger |
| 5,745,391 A | 4/1998 | Topor |
| 5,952,096 A | 9/1999 | Yamashita |
| 6,019,476 A | 2/2000 | Kirschner |
| 6,229,252 B1 | 5/2001 | Teng et al. |
| 6,663,978 B1 | 12/2003 | Olsen |
| 6,778,238 B2 | 8/2004 | Moon |
| 6,824,712 B1 | 11/2004 | Yang |
| 6,826,001 B2 | 11/2004 | Funakura |
| 6,846,579 B2 | 1/2005 | Anderson |
| 6,955,430 B2 | 10/2005 | Pratt |
| 6,984,038 B2 | 1/2006 | Ishak |
| 6,991,849 B2 | 1/2006 | Oya |
| 7,014,336 B1 | 3/2006 | Ducharme |
| 7,019,331 B2 | 3/2006 | Winters |
| 7,019,799 B2 | 3/2006 | Utsumi |
| 7,019,903 B2 | 3/2006 | Berger |
| 7,029,118 B2 | 4/2006 | Ishak |
| 7,045,944 B2 | 5/2006 | Ushifusa |
| 7,066,596 B2 | 6/2006 | Ishak |
| 7,071,602 B2 | 7/2006 | Terui |
| 7,126,589 B2 | 10/2006 | Sung |
| 7,158,300 B2 | 1/2007 | Shimoda |
| 7,193,779 B2 | 3/2007 | Kim |
| 7,218,044 B2 | 5/2007 | Kim |
| 7,258,923 B2 | 8/2007 | Bogerd |
| 7,491,440 B2 | 2/2009 | Fukatani |
| 7,520,608 B2 | 4/2009 | Ishak |
| 7,524,060 B2 | 4/2009 | Ramos |
| 7,556,376 B2 | 7/2009 | Ishak |
| 7,572,028 B2 | 8/2009 | Mueller |
| 7,579,769 B2 | 8/2009 | Wu |
| 7,630,128 B2 | 12/2009 | Krieg-Kowald |
| 7,695,180 B2 | 4/2010 | Schardt |
| 7,703,917 B2 | 4/2010 | Ramos |
| 7,731,791 B2 | 6/2010 | Deno |
| 7,755,276 B2 | 7/2010 | Wang |
| 7,785,501 B2 | 8/2010 | Segawa |
| 7,825,578 B2 | 11/2010 | Takashima |
| 7,832,903 B2 | 11/2010 | Ramos |
| 7,914,177 B2 | 3/2011 | Ramos |
| 8,034,206 B2 | 10/2011 | Kim |
| 8,044,942 B1 | 10/2011 | Leonhard |
| 8,063,999 B2 | 11/2011 | Jabri |
| 8,075,133 B2 | 12/2011 | Ramos |
| 8,075,145 B2 | 12/2011 | Engblom |
| 8,113,651 B2 | 2/2012 | Blum |
| 8,164,844 B2 | 4/2012 | Toda |
| 8,303,859 B2 | 11/2012 | Koo |
| 8,323,357 B2 | 12/2012 | Feldhues |
| 8,360,574 B2 | 1/2013 | Ishak |
| 8,403,478 B2 | 3/2013 | Ishak |
| 8,498,042 B2 | 7/2013 | Danner |
| 8,500,274 B2 | 8/2013 | Ishak |
| 8,506,114 B2 | 8/2013 | Van De Ven |
| 8,507,840 B2 | 8/2013 | Yu |
| 8,518,498 B2 | 8/2013 | Song |
| 8,547,504 B2 | 10/2013 | Guo |
| 8,570,648 B2 | 10/2013 | Ramos |
| 8,599,542 B1 | 12/2013 | Healey |
| 8,659,724 B2 | 2/2014 | Hagiwara |
| 8,680,406 B2 | 3/2014 | Chua |
| 8,716,729 B2 | 5/2014 | Wiesmann |
| 8,767,282 B2 | 7/2014 | Hashimura |
| 8,817,207 B2 | 8/2014 | Rho |
| 8,836,209 B2 | 9/2014 | Baek |
| 8,882,267 B2 | 11/2014 | Ishak |
| 8,957,835 B2 | 2/2015 | Hoellwarth |
| 8,982,197 B2 | 3/2015 | Kim |
| 9,051,232 B2 | 6/2015 | Kosuge |
| 9,063,349 B2 | 6/2015 | Ishak |
| 9,122,089 B2 | 9/2015 | Lee |
| 9,287,471 B2 | 3/2016 | de Brouwer |
| 9,377,569 B2 | 6/2016 | Ishak |
| 9,545,304 B2 | 1/2017 | Ishak |
| 9,575,335 B1 | 2/2017 | McCabe |
| 9,798,163 B2 | 10/2017 | Ishak |
| 9,814,658 B2 | 11/2017 | Ishak |
| 9,927,635 B2 | 3/2018 | Ishak |
| 2002/0005509 A1 | 1/2002 | Teng |
| 2002/0018890 A1 | 2/2002 | Sugimachi |
| 2002/0158574 A1 | 10/2002 | Wolk |
| 2003/0214695 A1 | 11/2003 | Abramson |
| 2004/0070726 A1 | 4/2004 | Ishak |
| 2004/0114242 A1 | 6/2004 | Sharp |
| 2004/0166342 A1 | 8/2004 | Wursche |
| 2004/0181006 A1 | 9/2004 | Warren, Jr. |
| 2004/0246413 A1 | 9/2004 | Stephenson |
| 2004/0232813 A1 | 11/2004 | Nakano |
| 2005/0042531 A1 | 2/2005 | Lee |
| 2005/0259082 A1 | 11/2005 | Potsch |
| 2005/0275769 A1 | 12/2005 | Roh |
| 2006/0012754 A1 | 1/2006 | Larson |
| 2007/0013649 A1 | 1/2007 | Kim |
| 2007/0030415 A1 | 2/2007 | Epstein |
| 2007/0077410 A1 | 4/2007 | Shi |
| 2007/0078216 A1 | 4/2007 | Cao |
| 2007/0195404 A1 | 8/2007 | Iijima |
| 2007/0216861 A1 | 9/2007 | Ishak |
| 2007/0275184 A1 | 11/2007 | Lee |
| 2008/0094566 A1 | 4/2008 | Ishak et al. |
| 2008/0137030 A1 | 6/2008 | Hoffman |
| 2008/0290787 A1 | 11/2008 | Cok |
| 2008/0297931 A1 | 12/2008 | Ramos |
| 2009/0058250 A1 | 3/2009 | Sin |
| 2009/0105437 A1 | 4/2009 | Determan |
| 2009/0128895 A1 | 5/2009 | Seo |
| 2009/0173958 A1 | 7/2009 | Chakraborty et al. |
| 2010/0039704 A1 | 2/2010 | Hayashi |
| 2010/0134879 A1 | 6/2010 | Yoshihara |
| 2010/0231830 A1 | 9/2010 | Hirakata |
| 2011/0019269 A1 | 1/2011 | Dirk |
| 2011/0043486 A1 | 2/2011 | Hagiwara |
| 2011/0157546 A1 | 6/2011 | Ishak |
| 2011/0176325 A1 | 7/2011 | Sherman |
| 2011/0234079 A1 | 9/2011 | Eom |
| 2011/0289654 A1 | 12/2011 | Williams |
| 2011/0299168 A1 | 12/2011 | Combs |
| 2011/0315939 A1 | 12/2011 | Okayasu |
| 2012/0021152 A1 | 1/2012 | Glaser |
| 2012/0038861 A1 | 2/2012 | Van Lieshout |
| 2012/0075577 A1 | 3/2012 | Ishak |
| 2012/0113672 A1 | 5/2012 | Dubrow et al. |
| 2012/0162106 A1 | 6/2012 | Choi |

(56) References Cited

U.S. PATENT DOCUMENTS

| | | |
|---|---|---|
| 2012/0162752 A1 | 6/2012 | Kitano |
| 2013/0009059 A1 | 1/2013 | Caruso |
| 2013/0063493 A1 | 3/2013 | House |
| 2013/0239874 A1 | 9/2013 | Smith |
| 2013/0282115 A1 | 10/2013 | Ishak |
| 2014/0009912 A1 | 1/2014 | Wheatley et al. |
| 2014/0049700 A1 | 2/2014 | Chen |
| 2014/0078420 A1 | 3/2014 | Liu |
| 2014/0093661 A1 | 4/2014 | Trajkovska |
| 2014/0233105 A1 | 8/2014 | Schmeder |
| 2014/0355106 A1 | 12/2014 | Laluet |
| 2014/0363767 A1 | 12/2014 | Murakami |
| 2015/0036379 A1 | 2/2015 | Lee |
| 2015/0098058 A1 | 4/2015 | De Ayguavives |
| 2015/0124188 A1 | 5/2015 | Kadowaki |
| 2015/0160478 A1 | 6/2015 | Ishak |
| 2015/0212238 A1 | 7/2015 | Chang |
| 2015/0212352 A1 | 7/2015 | Guo et al. |
| 2015/0238308 A1 | 8/2015 | Ishak et al. |
| 2015/0248033 A1 | 9/2015 | Zhu |
| 2015/0253653 A1 | 9/2015 | Fujita |
| 2015/0277003 A1 | 10/2015 | Ramos |
| 2015/0329684 A1 | 11/2015 | Kamimoto |
| 2015/0338561 A1 | 11/2015 | Moe |
| 2015/0378217 A1 | 12/2015 | Kim |
| 2017/0363884 A1 | 12/2017 | Hallock |
| 2018/0052362 A1 | 2/2018 | Kang |
| 2018/0064616 A1 | 3/2018 | Ishak |
| 2018/0107050 A1 | 4/2018 | Barrett |
| 2018/0113327 A1 | 4/2018 | Ishak |
| 2019/0121176 A1 | 4/2019 | Lee |
| 2019/0196071 A1* | 6/2019 | Barrett ............... G02B 5/208 |
| 2019/0219751 A1 | 7/2019 | Barrett et al. |
| 2019/0285941 A1 | 9/2019 | Liu et al. |
| 2020/0166798 A1 | 5/2020 | Garbar et al. |

FOREIGN PATENT DOCUMENTS

| | | | |
|---|---|---|---|
| CN | 201666985 U | | 12/2010 |
| CN | 102879920 A | | 1/2013 |
| CN | 202847016 U | | 4/2013 |
| CN | 103448312 B | | 12/2013 |
| CN | 203410122 U | | 1/2014 |
| CN | 103941320 A | | 7/2014 |
| CN | 204213761 U | | 3/2015 |
| CN | 104614786 A | | 5/2015 |
| CN | 104950515 A | | 9/2015 |
| CN | 106796306 A | * | 5/2017 ............ G02B 5/283 |
| CN | 105788474 B | | 2/2019 |
| CN | 106324908 B | | 2/2019 |
| CN | 209782327 U | | 12/2019 |
| DE | 202014000982 U1 | | 3/2014 |
| EP | 0509727 A2 | | 10/1992 |
| EP | 0855602 A1 | | 7/1998 |
| EP | 0965034 B1 | | 5/2007 |
| EP | 2085798 A1 | | 8/2009 |
| EP | 2095177 A1 | | 9/2009 |
| EP | 2096471 A1 | | 9/2009 |
| EP | 2128889 A1 | | 12/2009 |
| EP | 2260348 A2 | | 12/2010 |
| EP | 1794240 B1 | | 1/2013 |
| EP | 2874001 A1 | | 5/2015 |
| EP | 3026485 A2 | | 6/2016 |
| FR | 2909779 A1 | | 6/2008 |
| JP | 2001315240 A | | 11/2001 |
| JP | 2003149605 A | | 5/2003 |
| JP | 2006031030 A | | 2/2006 |
| JP | 2010511205 A | | 4/2010 |
| JP | 2010261986 A | | 11/2010 |
| JP | 2013067811 A | | 4/2013 |
| JP | 2013222212 A | | 10/2013 |
| JP | 2013238634 A | | 11/2013 |
| JP | 2014000819 A | | 1/2014 |
| JP | 2014225030 A | | 12/2014 |
| JP | 2016128931 A | | 7/2016 |
| KR | 10-2006-0048986 A | | 5/2006 |
| KR | 101815619 B1 | | 1/2018 |
| WO | 1988002871 A1 | | 4/1988 |
| WO | 2002101695 A1 | | 12/2002 |
| WO | 2004090589 A1 | | 10/2004 |
| WO | 2005034066 A1 | | 4/2005 |
| WO | 2005106542 A1 | | 11/2005 |
| WO | 2007075520 A2 | | 7/2007 |
| WO | 2007109202 A2 | | 9/2007 |
| WO | 2007146933 A2 | | 12/2007 |
| WO | 2008024414 A2 | | 2/2008 |
| WO | 2008067109 A1 | | 6/2008 |
| WO | 2008106449 A1 | | 9/2008 |
| WO | 2009123754 A2 | | 10/2009 |
| WO | 2010111499 A1 | | 9/2010 |
| WO | 2012006265 A1 | | 1/2012 |
| WO | 2013123592 A1 | | 8/2013 |
| WO | 2013176888 A1 | | 11/2013 |
| WO | 2013188825 A1 | | 12/2013 |
| WO | 2014055513 A1 | | 4/2014 |
| WO | 2014077166 A1 | | 5/2014 |
| WO | 2014096475 A1 | | 6/2014 |
| WO | 2014196638 A1 | | 12/2014 |
| WO | 2015179761 | | 11/2015 |
| WO | 2016179906 A1 | | 11/2016 |
| WO | 2016205260 A1 | | 12/2016 |
| WO | 2019099554 A1 | | 5/2019 |
| WO | 20200180947 A1 | | 9/2020 |
| WO | 2021108105 A1 | | 6/2021 |
| WO | 2021108107 A1 | | 6/2021 |

OTHER PUBLICATIONS

Search Report and Examination Opinion for European Application No. 15796219.2; dated Mar. 26, 2019; date of filing: May 22, 2015; 5 pp.

First Office Action for C.N. Application No. 201580040377.2 (national phase of PCT/US2015/032175); dated Feb. 24, 2018; date of filing: May 22, 2015; 5 pp.

Second Office Action for C.N. Application No. 201580040377.2 (national phase of PCT/US2015/032175); dated Jan. 2, 2019; date of filing: May 22, 2015; 12 pp.

First Office Action for J.P. Application No. 2017-032775 (national phase of PCT/US2015/032175); dated May 15, 2019; date of filing: May 22, 2015; 6 pp.

Second Office Action for J.P. Application No. 2017-032775 (national phase of PCT/US2015/032175); dated Feb. 4, 2020; date of filing: May 22, 2015; 22 pp.

International Search Report and Written Opinion for International Application No. PCT/US2016/037457, dated Sep. 16, 2016; date of filing: Jun. 14, 2016; 7 pp.

First Office Action for C.N. Application No. 201680048240.6 (national phase of PCT/US2016/037457); dated Jan. 16, 2020; date of filing: Jun. 14, 2016; 10 pp.

Non-Final Office Action for U.S. Appl. No. 15/844,109; dated Sep. 4, 2019; filed Dec. 15, 2017; 49 pp.

Final Office Action for U.S. Appl. No. 15/844,109; dated Jan. 16, 2020; filed Dec. 15, 2017; 12 pp.

International Search Report and Written Opinion for International Application No. PCT/US2018/061103, dated Jan. 24, 2019; date of filing: Nov. 14, 2018; 6 pp.

Non-Final Office Action for U.S. Appl. No. 16/360,599; dated Jun. 28, 2019; filed Mar. 21, 2019; 11 pp.

Non-Final Office Action for U.S. Appl. No. 16/695,983; dated Jun. 30, 2020; filed Nov. 26, 2019; 24 pp.

Non-Final Office Action for U.S. Appl. No. 16/855,497; dated Jul. 1, 2020; filed Apr. 22, 2020; 13 pp.

Abramowitz, Mortimer and Davidson, Michael W. "Kodak Color Compensating Filters Yellow." Olympus Microscopy Resource Center. olympus-lifescience.com. Retrieved May 16, 2019.

Doeffinger, Derek, editor. Using Filters. Eastman Kodak Company, 1988. The Kodak Workshop Series, pp. 11, 13, 17, 46, 68-69.

Fonseca, "Apple patents a virtual reality headset for iPhone," http://vr-zone.com/articles/apple-patents-virtual-reality-headset-iphone/87267.html, Jun. 22, 2015, 4 pp.

(56) References Cited

OTHER PUBLICATIONS

Van Der Lely, et al., "Blue Blocker Glasses as a Countermeasure for Alerting Effects of Evening Light-Emitting Diode Screen Exposure in Male Teenagers," Journal of Adolescent Health, Aug. 2014, 7 pp.
Kim, Boris F. and Bohandy, Joseph. "Spectroscopy of Porphyrins." Johns Hopkins APL Technical Digest, vol. 2, No. 1, 1981, pp. 153-163, www.jhuapl.edu/techdigest/views/pdfs/V02_N3.../V2_N3_1981_Kim. Retrieved Apr. 12, 2019.
Giovannetti, Rita. "The Use of Spectrophotometry UV-Vis for the Study of Porphyrins." Macro to Nano Spectroscopy, Uddin, Jamal (Ed.), IntechOpen Limited, 2012, pp. 87-108, www.intechopen.com/books/macro-to-nano-spectroscopy/the-use-of-spectrophotometry-uv-vis-for-thestudy-of-porphyrins. Retrieved Apr. 12, 2019.
Fritz, Norman L. "Filters: An Aid in Color-Infrared Photography." Photogrammetric Engineering and Remote Sensing, vol. 43, No. 1, Jan. 1977, pp. 61-72, www.asprs.org/wp-content/uploads/pers/1977journal/.../1977_jan_61-72. Retrieved Apr. 4, 2019.
Perovich, B. W. "Black and White Filters Tutorial." Freestyle Photographic Supplies. www.freestylephoto.biz/black-and-white-filters-tutorial. Retrieved Apr. 12, 2019.
Richards, Bryce S. "Up- and Down-Conversion Materials for Photovoltaic Devices" Proceedings of SPIE—The International Society for Optical Engineering, 9 pp. Apr. 2012.
Simmons, Adam "The Evolution of LED Backlights." PC Monitors www.pcmonitorsinfo/articles. Retrieved May 1, 2017.
Gallas, Jim and Eisner, Mel; Chapter 23—Eye protection from sunlight damage; Journal; 2001; 437, 439-455; vol. 3. Comprehensive Series in Photosciences, Elvesier, abstract only.
"Capturing All the Light: Panchromatic Visible Absorption for Solar Photoconversion." U.S. Department of Energy, Basic Energy Sciences, Jun. 1, 2014, science.energy.gov/bes/highlights/2014/bes-2014-06-g/. Retrieved Apr. 12, 2019.
"Filters for Color Photomicrography," Olympus America Inc., Olympus Microscopy Resource Center, http://www.olympusmicro.com/primer/photomicrography/colorfilters.html, Mar. 2012, 7 pp.
"Kentek Laser Safe Window Protection", Retrieved at <<http://www.kenteklaserstore.com/category.aspx?categoryID=311>>, 1 pp. Retrieved on Apr. 28, 2014.
"Laser and fluorescent dyes, UV and NIR dyes, security inks and other optically functional materials", Retrieved at http://www.fabricolorholding.com/product, 2 pp. Retrieved May 18, 2015.
"Reticare, the first ocular protector for electronic device screens to launch at CES 2014"; https://www.reticare.com/tienda/en/blog/post/3-reticare-the-first-ocular-protector-for-electronic-device-screens-to-launch-at-ces-2014; Jan. 10, 2014; 7 pp. Retrieved Nov. 30, 2017.
"Spectral-Transmittance Bar Charts for Selected Kodak Wratten Filters." google search (www.google.com), search terms: kodak wratten filters bar chart, second image (wratten filter specs, iclane.net). Retrieved May 16, 2019.
"XGear Krystal Sapphire Screen Protector Film Shield For Apple IPhone 4 4S", Retrieved at <<http://www.ebay.com/itm/XGear-Krystal-Sapphire-Screen-Protector-Film-Shield-For-Apple-IPhone-4-4S-/221364527502>>, 3 pp. Retrieved Apr. 28, 2014.
ebay.com, screenshot of ebay purchase of Apr. 23, 2019. Retrieved May 16, 2019.
Illuminant D65, 4 pp.
Kodak advertisement. Buchsbaum, Ralph. Animals Without Backbones. The University of Chicago Press, 1948.
"290 nm UV Dye", Technical Data Sheet, Product Code: UV290A, QCR Solutions Corp, Version: 2011.UV Dyes, www.qcrsolutions.com, 1 page.
"530 nm Visible Dye", Technical Data Sheet, Product Code: VIS530A, QCR Solutions Corp, Version: 2011.VIS Dyes, www.qcrsolutions.com, 1 page.
"675 nm Visible Dye", Technical Data Sheet, Product Code: VIS675F, QCR Solutions Corp, Version: 2011.VIS Dyes, www.qcrsolutions.com, 1 page.

"ABS 668: Visible Narrow Band Absorber", Exciton, Inc., www.exciton.com, 1 page.
"ABS 691: Visible Narrow Band Absorber", Exciton, Inc., www.exciton.com, 1 page.
"DYE VIS 347", Adam Gates & Company, LLC, www.adamgatescompany.com, 1 page.
"DYE VIS 670", Adam Gates & Company, LLC, www.adamgatescompany.com, 1 page.
"DYE VIS 671", Adam Gates & Company, LLC, www.adamgatescompany.com, 1 page.
"ADS640PP Product Specification", American Dye Source, Inc., Retrieved at <<https://adsdyes.com/products/laser-dyes-2/ads640pp/>>, Retrieved on May 18, 2015, 1 page.
"Infrared Dye 1422", Adam Gates & Company, LLC, www.adamgatescompany.com, 1 page.
"1003 nm NIR Dye", Technical Data Sheet, Product Code: NIR1003A, QCR Solutions Corp, Version 2011.NIR Dyes, www.qcrsolutions.com, 1 page.
"1031 nm NIR Dye", Technical Data Sheet, Product Code: NIR1031M, QCR Solutions Corp, Version: 2011.NIR Dyes, www.qcrsolutions.com, 1 page.
"1072 nm NIR Dye", Technical Data Sheet, Product Code: NIR1072A, QCR Solutions Corp, Version: 2011.NIR Dyes, www.qcrsolutions.com, 1 page.
"1073nm NIR Dye", Technical Data Sheet, Product Code: IR Dye 1151, Adam Gates & Company, LLC, www.adamgatescompany.com, 1 page.
"LUM690 Near Infrared Dye", Moleculum, moleculum.com, Jan. 2015, 2 pages.
"LUM995 Near Infrared Dye", Moleculum, moleculum.com, Jan. 2015, 2 pages.
"Near Infrared Dye: LUM1000A", Moleculum, moleculum.com, Jan. 2015, 1 page.
"Tinuvin P Benzotriazole UV Absorber", Ciba Specialty Chemicals, Inc.,Printing Date: Aug. 1998, 2 pages.
A-594-5 Invisible Blue Pigment, dayglo.com, 1 page. Retrieved Jun. 2, 2019.
Sunstone Luminescent UCP Nanocrystals, sigmaaldrich.com, 7 pp. Retrieved Apr. 17, 2017.
"New ANSI/ISEA Z87. 1-2010 Standard", Uvex by Sperian, 2 pages.
ANSI Z80.3-2015, Nonprescription Sunglass and Fashion Eyewear Requirements, 41 pp.
ASTM International E 313-05; Standard Practice for Calculating Yellowness and Whiteness Indices from Instrumentally Measured Color Coordinates; Article; 6 pp.
U.S. Appl. No. 16/695,983, filed Nov. 26, 2019; 54 pp.
U.S. Appl. No. 16/696,516, filed Nov. 26, 2019; 60 pp.
Non-Final Office Action for U.S. Appl. No. 14/719,604; dated Aug. 24, 2016; filed May 22, 2015; 41 pp.
Final Office Action for U.S. Appl. No. 14/719,604; dated Mar. 28, 2017; filed May 22, 2015; 66 pp.
Non-Final Office Action for U.S. Appl. No. 14/719,604; dated Aug. 30, 2017; filed May 22, 2015; 59 pp.
International Search Report and Written Opinion for International Application No. PCT/US2015/032175, dated Aug. 28, 2015; date of filing: May 22, 2015; 10 pp.
Final Office Action for U.S. Appl. No. 16/855,497; dated Sep. 22, 2020; filed Apr. 22, 2020; 12 pp.
International Search Report and Written Opinion for International Application No. PCT/US2021/052904, dated Dec. 27, 2021; date of filing: Sep. 30, 2021.
Extended European Search Report pertaining to European Patent Application No. 20891730.2, dated Dec. 14, 2021.
Office Action pertaining to corresponding Korean Patent Application No. 10-2021-7021453, dated Dec. 22, 2021.

\* cited by examiner

LIGHT MANAGEMENT FILTER AND RELATED SOFTWARE

CROSS-REFERENCE TO RELATED APPLICATIONS

This application claims the benefit of U. S. Provisional Pat. Ser. No. 62/772,513, filed Nov. 28, 2018, and titled LIGHT EMISSION MODIFICATION, and cofiled and copending U.S. patent application Ser. No. 16/695,983, filed Nov. 26, 2019, and titled LIGHT EMISSION MODIFICATION. All references cited within are incorporated herein by reference in their entirety.

FIELD

The present invention relates to a filter for reducing light emission of portions of the light spectrum.

BACKGROUND

Electronic devices, such as portable electronic display devices typically emit a visible light spectrum of which humans are able to detect wavelengths from about 380 nm to about 740 nm. Recently, it has been appreciated that certain characteristics of this light may be harmful to the user, and may lead to health symptoms and reactions, such as but not limited to eye strain, dry and irritated eyes, and headaches. Studies suggest that cumulative and prolonged exposure to the high-energy wavelengths of the visible blue light spectrum (380 nm-500 nm) emitted from digital screens may be leading to various health issues such as, but not limited to those listed above. Within the high-energy visible light spectrum (380-500 nm), a narrower band that has been recognized as especially harmful (415 nm-455 nm).

Some solutions have been proposed and implemented to reduce these especially harmful wavelengths emitted from electronic devices. For example, physical filters, software programs, or applications are available which may be able to manage harmful light emissions within the visible light spectrum including the 380 nm-740 nm.

However, implementations of filters and/or software suffer drawbacks that hinder the user experience or efficacy of light management within the high-energy visible blue light spectrum. Software solutions alone typically impact the entire visible light spectrum, which leads to significant impact to the color temperature and overall system color accuracy. Physical filters alone typically have limitations to coverage across the blue light spectrum and may also impact the system color.

Another drawback to using software filtration of the high-energy visible light spectrum emitted from electronic devices is that there are limitations to the management of narrow bands of light recognized as especially harmful (415 nm-455 nm). Existing solutions for managing high-energy blue light including those shown in FIG. 2 have an inability to reduce only the harmful band of light, therefore impacting the system color. Additionally, the electronic device user has the ability to turn on or off the software, allowing for unfiltered light from the harmful light band without manual adjustment.

Additionally, it is recognized that exposure to high-energy visible blue light is cumulative in terms of causing adverse health effects. Existing solutions do not take into account the cumulative intake of high-energy visible blue light and are unable to intelligently adjust the system based on this information.

SUMMARY

Therefore, a need exists in the field for a novel physical filter integrated within a device display combined with a software application which is able to recognize cumulative exposure and adjust levels of high-energy blue light in accordance with time exposure and other factors. Additionally, there are certain pre-existing conditions and other factors including, for example, age, where intelligent systems can be used to manage high-energy visible blue light. Intelligent system combining a physical filter and software allows for automatic or logical adjustment to blue light emission from the display device which may be automatic or in accordance with logic.

The present disclosure includes a novel physical filter integrated within the construction of the electronic device display, which is combined with a software system to adjust the high-energy blue light spectrum in accordance with factors including time exposure of the electronic devices. The physical filter may be positioned on the device screen or within the construction of the screen with the software application providing adjustment of the spectrum relative to the properties of the physical filter. In preferred embodiments, the electronic device hardware utilizes the camera and software to adjust the light emissions based on factors including total device time usage, ambient lighting, and distance from the display.

Features and advantages of the present disclosure will be more readily understood from the following detailed description which should be read in conjunction with the accompanying drawings.

BRIEF DESCRIPTION OF THE DRAWING

The drawings are schematic illustrations and are not intended to limit the scope of the invention in any way. The drawings are not necessarily to scale. Some embodiments of the present invention are illustrated as an example and are not limited by the figures of the accompanying drawings, in which like references may indicate similar elements and in which.

DETAILED DESCRIPTION

The terminology used herein is for the purpose of describing particular embodiments only and is not intended to be limiting of the invention. As used herein, the term "and/or" includes any and all combination of one or more of the associated listed items. As used herein, the singular forms "a", "an", and "the" are intended to include the plural forms as well as the singular forms, unless the context clearly indicates otherwise. It will be further understood the terms "comprises" and/or "comprising", when used in this specification, specify the presence of stated features, steps, operations, elements and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity this description will refrain from repeating every possible combination of the individual steps in an unnecessary fashion. Nevertheless, the specification and claims should be read with the understanding that such combinations are entirely within the scope of the invention and the claims.

New physical device filters for managing light in combination with software application systems for managing high-energy blue light as an intelligent system are discussed herein. In the following description, for purposes of explanation, numerous specific details are set forth in order to provide a thorough understanding of the present disclosure. It will be evident, however, to one skilled in the art that the present invention may be practiced without these specific details.

Figure 1:
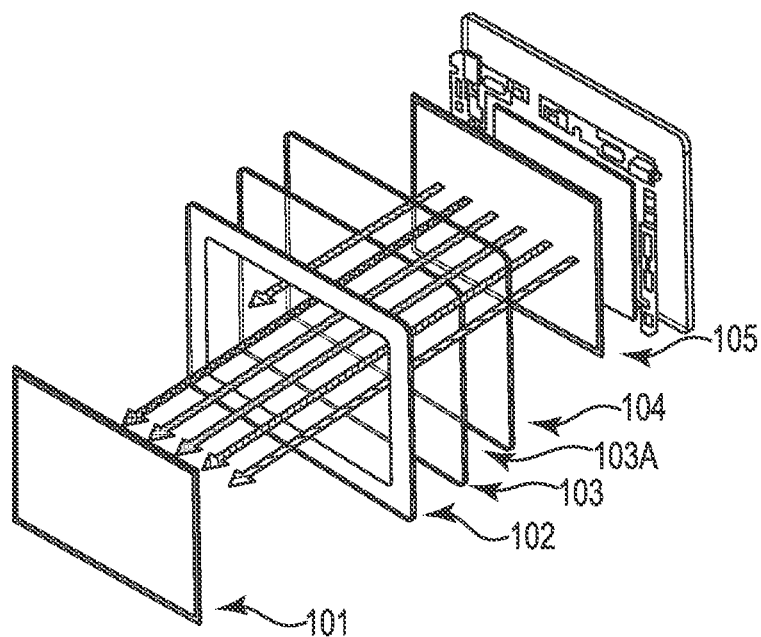
FIG. 1 is an exploded perspective view of a portion an embodiment of the disclosed filter.
Figure 2:
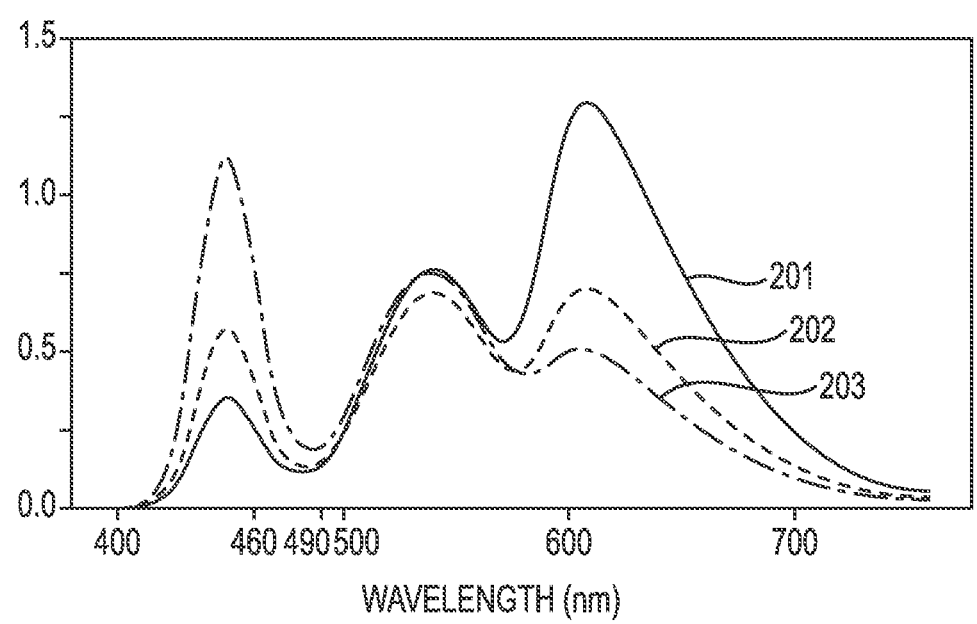
FIG. 2 is an illustration of the emission spectra for typical software only systems for the management of the high-energy visible blue light according to prior art.

The present disclosure is to be recognized as an exemplification of the disclosure and is not intended to limit the disclosure to the specific embodiments illustrated by the figures or description below. The present disclosure will now be described by referencing the appended figures representing preferred embodiments. FIG. 1 depicts an exploded perspective view of the elements that may comprise an electronic device display, representative of the construction of an LCD (liquid crystal display) or OLED (organic light-emitting diode device) display (the "device") according to various embodiments of the present invention. In preferred embodiments, a physical filter which provides the purpose of light filtration specific to the high-energy visible blue light spectrum (380 nm-500 nm), or specific to the harmful blue light spectrum (415 nm-455 nm), are included within the construction. FIG. 1 depicts the physical filter applied to the cover glass 103A, however the filter may be applied to other layers shown.

The physical filter providing light management according to these light spectrums may come forms including a thin film, optically clear adhesive or other physical barrier providing light management of the high-energy visible light spectrum (the "physical filter"). In some embodiments, the physical filter may be applied within the display construction including application to the interior of the cover glass or the polarizer.

Figure 3:
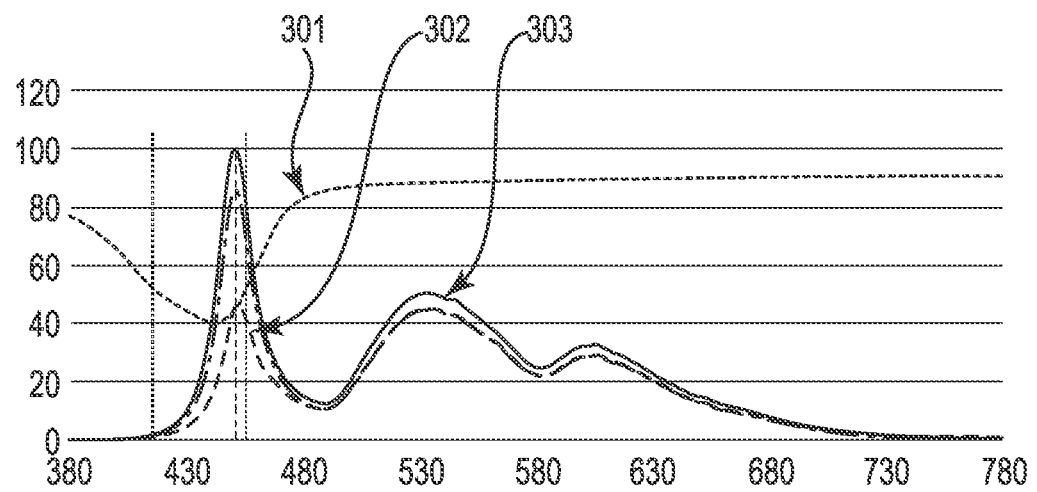
FIG. 3 is an illustration of the emission spectra for an embodiment of a disclosed physical filter.

As shown in FIG. 3, the physical filter applied to the device provides light management properties specific to the UV and high-energy visible blue light spectrum. This integrated barrier within the device provides protection from UV light (<380 nm), high-energy visible blue light (380 nm-500 nm) and may selectively filter the narrow harmful band of blue light (415 nm-455 nm).

The software application provides recognition of the filtration provided by the physical filter in FIG. 3. The software application identifies the level of coverage to the high-energy visible blue light spectrum provided by the physical filter to the user. Additional coverage levels are identified by the software application in addition to that provided by the physical filter. The software provides tracking of the total time of device usage ("screen time") and adjusts the level of blue light coverage in relation and automatically.

As the user's screen time increases, the software system will adjust the level of blue light coverage. The automatic adjustment of blue light coverage may also take into account factors including the age of the user or preexisting medical conditions including Age Related Macular Degeneration (AMD), dry eye or other eye, sleep and health conditions. Additionally, the user has the ability to manually adjust the coverage levels.

The electronic device hardware may utilize the front facing camera to detect the distance of the device from the user, ambient lighting in the space, and other potential factors, and as a result adjust the coverage levels.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A novel filter comprising:
    a thin film that reduces high energy visible blue light passing therethrough; and
    software that identifies a level of high energy visible light reduction provided by the thin film,
wherein the software tracks a total time of device usage, and wherein the software adjusts a level of blue light coverage taking into account the level of visible light coverage and total time of device usage.

2. The novel filter according to claim 1, wherein the thin film comprises an optically clear adhesive.

3. The novel filter according to claim 1, wherein the high energy visible blue light has a wavelength of between about 380 nm and about 500 nm.

4. The novel filter according to claim 3, wherein the high energy visible light has a wavelength of between about 415 nm to about 455 nm.

* * * * *